July 30, 1929. J. T. BASSECHES 1,722,783

DISK WHEEL VALVE STEM CONSTRUCTION AND LOCK NUT THEREFOR

Filed Aug. 12, 1926

INVENTOR:
Jacob T. Basseches

Patented July 30, 1929.

1,722,783

UNITED STATES PATENT OFFICE.

JACOB T. BASSECHES, OF NEW YORK, N. Y.

DISK-WHEEL VALVE-STEM CONSTRUCTION AND LOCK NUT THEREFOR.

Application filed August 12, 1926. Serial No. 128,863.

My present invention relates to nuts, and has particular reference to a nut which may be utilized for co-operation with a threaded element, such as a bolt or valve stem, wherein the free end of the latter is either inaccessible or desirably considered so. Co-ordinately, my invention relates to a device embodying the combination between such a threaded member and nut.

Although I have herein illustrated, and shall hereinafter describe, my invention as employed in connection with a valve stem of a vehicle tire, nevertheless it will be understood that as to certain phases of my invention this particular application is not essential.

Where a threaded member has an end which is inaccessible, or where it is desirable to consider it inaccessible for the purpose of associating a nut therewith, the engagement of a nut of ordinary characteristics with such a member is rendered impossible. It is one object of the present invention to provide a nut which may be associated with a complementary member of the character described without having to resort to any initial association with the end of such a member. A feature of my invention lies in providing a nut with means for permitting adjustment of the nut into operative position with respect to the member by manipulation of the nut transversely of a midportion of the member.

For example, in the employment of vehicle tires with disk wheels, the mutual engagement between the tire and the wheel may result in having the valve stem constitute a threaded member of the character hereinbefore referred to. That is, the disk wheel will constitute a wall through which the stem will project first in one direction and then in the other, thereby positioning a midportion of the stem on one side of the wall. In such an event, the engagement of an ordinary nut with the stem would necessitate the initial engagement of the nut over the end of the stem before the final positioning of the tire has been effected. The procedure just described is beset with numerous disadvantages, and is the cause of great annoyance. My present invention contemplates the provision of a nut which will permit its asociation with the midportion of the stem referred to without necessitating this inconvenient and inefficient procedure.

A feature of my invention lies in providing a nut having a slot which is so arranged as to permit transverse adjustment of the nut over a midportion of the stem. Another feature lies in providing an arrangement wherein the stem is suitably constructed to facilitate such an association with a suitably designed nut.

Another feature of the invention lies in providing means for preventing a spreading of the nut after it has been positioned; and a preferred embodiment contemplates the employment of a co-operating member having a portion which peripherally embraces the nut after it has been positioned.

It is an object generally to provide a device of the character described which will have features of structural simplicity rendering its manufacture inexpensive and its utilization expedient.

For the attainment of the foregoing objects and such other objects as may hereinafter appear or be pointed out, I have illustrated several embodiments of my invention in the acompanying drawings in which—

Figure 1:
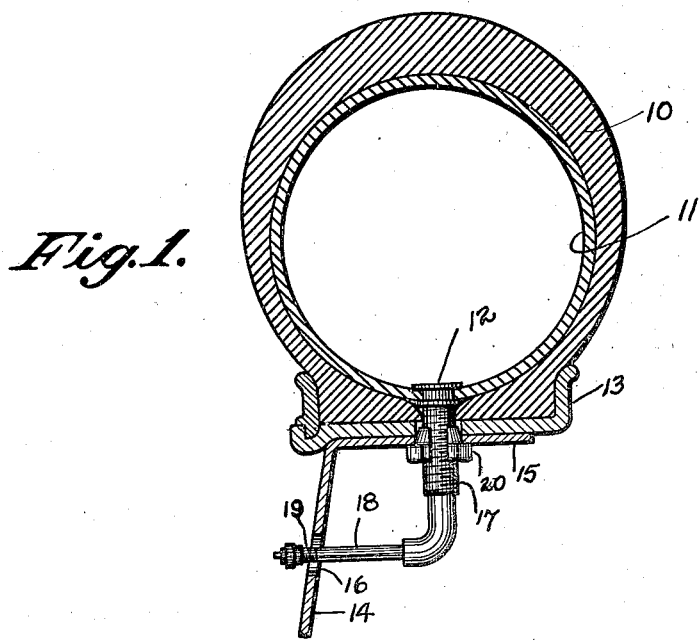
Fig. 1 is a cross-sectional view through a vehicle tire associated with a disk wheel, the section being taken along a line which discloses the possible arrangement and disposition of a valve stem.

Referring to the drawings and particularly to Fig. 1, it will be observed that I have shown a vehicle tire comprising an outer element 10, an inner element or tube 11, and a valve stem 12 associated with the latter. The entire device is preferably associated in a well-known manner with a rim 13 suitably constructed for association with a disk wheel. I have illustrated the latter as comprising a main or body portion 14 and a rim portion 15 forming an integral continuation of the body portion.

The rim 13 is adapted to overlie the rim portion 15 of the wheel, and both of these elements are provided with apertures or openings to permit the passage therethrough of the valve stem 12. The body portion 14 is also provided with an aperture 16 so as to permit the proper positioning of the valve stem. More particularly, I have shown the valve stem as comprising a so-called "gooseneck" construction wherein the stem has been shaped to provide two portions substantially perpendicular to each other. When the stem is in final position, the threaded portion 17 projects inwardly through the rim portion 15 of the wheel, and the outermost portion 18 of the stem projects outwardly through the aperture 16 so as to present the open end 19 of the stem in a position which is readily accessible from the outside of the wheel.

It will now be observed that the positioning of the end 19 on the outside of the wheel facilitates the inflation and deflation of the tire, but it renders the application of a nut of ordinary construction extremely difficult and inconvenient. In accordance with my invention, a nut is provided which may be associated with the stem after the latter has been positioned as shown in Fig. 1, this association being rendered possible by a manipulation of the nut with respect to the midportion of the stem disposed on the inner side of the wheel.

Figure 2:
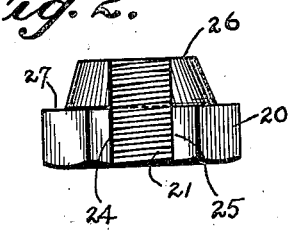
Fig. 2 is an elevational view of a nut embodying the features of my invention and of the character employed in Fig. 1.
Figure 3:
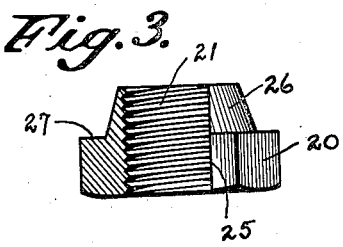
Fig. 3 is a view similar to Fig. 2, a portion of the nut having been broken away to disclose the interior arrangement thereof.

Referring now to Figs. 2 and 3, it will be noted that the nut which I employ for this purpose comprises essentially a main portion 20 having the general contour of an ordinary nut, and having a threaded bore 21 designed for engagement with the threaded portion 17. My invention provides a cut-out or split portion wherein a radial area of the nut material has been cut away. This provides a slot extending radially from the bore to the outside of the nut, and this slot is made of a width to permit the passage therethrough of a portion of the stem, whereby the nut may be positioned upon the stem by transverse adjustment thereover.

I have found it preferable to provide the stem with a portion of reduced diameter, and to provide the nut with a slot whose width is substantially equal to this reduced portion. In the embodiment shown, I have reduced the diameter of the portion 18, although obviously this reduction may be made to take place at other portions of the stem. In other words, the diameter of the portion 18 and the width of the slot provided in the nut are so proportioned that the nut may be transversely passed over the portion 18 and thence positioned concentrically with respect to the threaded portion 17.

Figure 4:
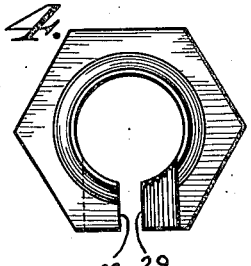
Fig. 4 is a plan view of a nut embodying a modified feature.
Figure 5:
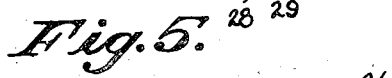
Fig. 5 is a view similar to Fig. 2 and disclosing the elevational appearance of the nut of Fig. 4.

Referring for the moment to Figs. 4 and 5, it will be observed that whereas the slot of Figs. 2 and 3 is arranged longitudinally parallel to the axis of the nut, the slot of Figs. 4 and 5 is arranged to form an angle with the axis. In the latter embodiment, the perpendicular distance between the walls 22 and 23 of the slot is substantially equal to the perpendicular distance between the walls 24 and 25 of the slot shown in Figs. 2 and 3.

In order to prevent the spreading of the nut due to the jarring of the vehicle or other causes, I may provide an extension 26 thereon which will position itself within the opening in the rim portion 15. I have illustratively shown this extended portion 26 in the form of a truncated cone whose base rests upon the upper edge 27 of the main nut portion 20. The base of this truncated cone is of smaller diameter than that of the main portion 20, so that a marginal shoulder is provided along the upper face 27. This shoulder is adapted to engage with the marginal portion in the rim 15, it being understood that the present device is designed to tighten and hold the stem in position with respect to the rim 15.

Although the conical shape of the extension 26 may result in a jamming or locking action between the rim 15 and the nut, nevertheless such an action is not primarily contemplated, and the function of the extended portion 26 would still be carried out if its shape were cylindrical rather than conical. It will be observed that the slot is made to extend for the entire longitudinal length of the nut. The same is true in Figs. 4 and 5, and the advantage of making the slot as shown in the latter figures lies in the fact that the circumferential gap is substantially reduced. In other words, the circumferential distance between the upper edge 28 of the wall 22 and the lower edge 29 of the wall 23 is substantially less than the circumferential gap which exists between the opposite walls 24 and 25. The firmness of engagement between the nut and the stem is therefore enhanced, and if desired, the inclination of the slot may be increased so that the circumferential gap referred to is reduced to zero.

Figure 6:
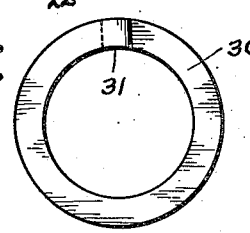
Fig. 6 is a plan view of a washer which may be employed in connection with my device.

If desired, the longitudinal passage which the provision of a slot entails and through which dust and other foreign matter may pass, may be sealed by the utilization of a washer 30 illustratively exemplified in Fig. 6. This washer is split as shown at 31 so that it may be similarly positioned upon the stem by transverse adjustment over a portion of the latter. Such a washer is desirably proportioned to seat upon the marginal shoulder hereinbefore referred to, whereby the longitudinal passage will be effectually blocked.

Figure 7:
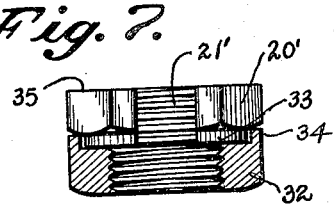
Fig. 7 is an elevational view, partly in section, illustrating a further modification.

In the embodiments so far illustrated, the co-operating element which embraces a portion of the nut in order to prevent spreading thereof, consists of the rim 15, the engagement of the extended portion 26 with the walls of the opening in the rim 15 preventing a spreading of the nut. In Fig. 7 I have illustrated a modified form of construction wherein a portion of the nut is peripherally embraced by a second complementary nut of similar construction. In this embodiment, an extension of the character hereinbefore illustrated and referred to by the reference numeral 26, has been omitted. The main or body portion 20′ is substantially similar to the portion 20, the threaded bore 21′ corresponds to the threaded bore 21, and a slot is similarly provided as hereinbefore described. As a complementary and co-operating member, I provide a second nut 32 provided with means for peripherally engaging a portion of the nut 20′. I have illustratively shown the nut 20′ provided with a small extension 33 of slightly reduced diameter, and I have shown the nut 32 provided with a peripheral flange 34 adapted to engage and embrace the extension 33. The nut 32 is split similarly to the nut 20′, and hence both of these elements may be associated with the stem in the expeditious manner which the invention contemplates. After this association has been effected, the nut 20′ may be screwed upon the portion 17 so as to bring its upper face 35 into engagement with the under face of the rim 15. Thereupon, the nut 32 may be screwed upon the portion 17 until the flange 34 embraces the extension 33. It will be observed that the nut 32 is not a lock nut, in the ordinary sense of the word, there being nothing to prevent the eventual spreading thereof. However, the spreading of the nut 20′ is rendered more difficult and unlikely by the presence of the nut 32.

It will thus be observed that I have shown a device which is extremely efficient, yet simple of construction. The cost of manufacture is consequently extremely low. The application of the device is very expeditious and permits a tire of the character described to be associated with a disk wheel with great facility. Obviously, my invention is not limited in its application to a valve stem, nor to a valve stem of the particular configuration illustrated. It will also be obvious that many changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

It will further be observed that in the modification shown in Figs. 4 and 5, the angularly disposed slot may be positioned in a direction inclined opposite to that illustrated in order that the grain of this angularly disposed portion may not offer any resistance to the locking operation where a right handed thread is used. The inclination of the slot in this direction will further serve to lock the nut by engagement of the slotted portion with a wall of the rim by the biting action therewith in a lefthanded direction. This construction will not only have utility where the extended portion 26 is used, but where this extended portion is omitted, depending upon the rigidity of the hexagonal portion of the nut to prevent spreading thereof.

Having thus described my invention and illustrated its use, what I claim as new and desire to secure by Letters Patent is—

1. The combination with a stem having a threaded portion and a reduced portion, of a one-piece nut for engagement with the threaded portion and provided with a cut arranged to permit passage of the reduced portion therethrough, whereby the nut may be brought into operative position by transverse adjustment thereof with respect to the reduced portion.

2. For use with a disk-wheel having an opening and a valve stem extending through said opening, a one-piece nut for engagement with said stem, said nut having a split portion to permit transverse adjustment thereof over said stem, and said nut having a portion extendable into said opening to prevent spreading of the nut.

3. A nut for engagement with the valve stem of a tire adjacent to the rim, said nut having a split portion arranged to permit transverse adjustment of the nut over the stem, said split portion being formed by a slot extending radially outwardly from the bore of the nut and being longitudinally disposed along a line forming an angle with the nut axis.

In witness whereof I have hereunto signed my name this 5th day of August, 1926.

JACOB T. BASSECHES.